(12) United States Patent
Chan et al.

(10) Patent No.: US 8,811,051 B2
(45) Date of Patent: Aug. 19, 2014

(54) CURRENT CONVERTOR

(71) Applicant: Lien Chang Electronic Enterprise Co., Ltd., New Taipei (TW)

(72) Inventors: Chun-Kong Chan, New Taipei (TW); Ming-Hsiang Chen, New Taipei (TW)

(73) Assignee: Lien Chang Electronic Enterprise Co., Ltd., New Taipei (TW)

( * ) Notice: Subject to any disclaimer, the term of this patent is extended or adjusted under 35 U.S.C. 154(b) by 2 days.

(21) Appl. No.: 13/678,514

(22) Filed: Nov. 15, 2012

(65) Prior Publication Data
US 2014/0133207 A1    May 15, 2014

(51) Int. Cl.
  *H02M 7/02*    (2006.01)
(52) U.S. Cl.
  USPC ......................................................... 363/146
(58) Field of Classification Search
  CPC ... H02M 7/003; H02M 7/02; H02M 2007/00; H02M 2007/02
  USPC .......... 363/146; 439/218, 221, 224, 374, 105, 439/628
  See application file for complete search history.

(56) References Cited

U.S. PATENT DOCUMENTS

| | | | | | |
|---|---|---|---|---|---|
| 4,625,259 | A | * | 11/1986 | Krechmer et al. | 361/610 |
| 5,744,934 | A | * | 4/1998 | Wu | 320/111 |
| 5,973,948 | A | * | 10/1999 | Hahn et al. | 363/146 |
| 6,086,395 | A | * | 7/2000 | Lloyd et al. | 439/172 |
| 6,266,261 | B1 | * | 7/2001 | Lanni | 363/144 |
| D663,266 | S | * | 7/2012 | Tien | D13/110 |
| 8,215,976 | B2 | * | 7/2012 | Peng et al. | 439/345 |

* cited by examiner

*Primary Examiner* — Gary L Laxton
(74) *Attorney, Agent, or Firm* — Li & Cai Intellectual Property (USA) Office

(57) ABSTRACT

The current convertor comprises a current converting device and a combinative plug. The current converting device comprises a casing and a current converting module arranged in the casing. The casing has at least one track extended from an outer surface of the casing along a sliding direction. The combinative plug comprises an insulating body and a conductive pin set disposed on the insulating body. The insulating body has a quick releasing portion conformed in shape to the track. The quick releasing portion is detachably sliding on the track of the casing along the sliding direction for maintaining the relative position between the current converting device and the combinative plug and for establishing electrical connection between the conductive pin set and the current converting module.

10 Claims, 12 Drawing Sheets

CURRENT CONVERTOR

BACKGROUND OF THE INVENTION

1. Field of the Invention

The instant disclosure relates to a current convertor; more particular, to a current convertor with a quick releasing structure.

2. Description of Related Art

Please refer to FIG. 1. One end portion of the conventional current converting device 10 is provided for an AC transmission wire 20 to insert, thereby electrically connecting to a wall socket 40 via the AC transmission wire 20. The opposite end portion of the conventional current converting device 10 is electrically coupling to an electronic device 50 via a DC transmission wire 30.

However, according to the above design, the connection portion of the AC transmission wire 20 and the current converting device 10 is easily separated to result the power transmission to stop immediately, so that the electronic device 50 will be damaged. Moreover, the AC transmission wire 20 is not suitably for carrying.

To achieve the abovementioned improvement, the inventors strive via industrial experience and academic research to present the instant disclosure, which can provide additional improvement as mentioned above.

SUMMARY OF THE INVENTION

One embodiment of the instant disclosure provides a current convertor having a current converting device and a combinative plug firmly and easily detachably installed on the current converting device.

The current convertor for inserting into a conventional outlet, comprises a current converting device and a combinative plug. The current converting device comprises a casing and a current converting module. The casing defines an accommodating space and a first opening in communication with the accommodating space. The casing has at least one track adjacent to the first opening, and the track is extended from an outer surface of the casing along a sliding direction. The current converting module is arranged in the accommodating space of the casing. The combinative plug comprises an insulating body and a conductive pin set. The insulating body has a quick releasing portion conformed in shape to the track. The conductive pin set is disposed on the insulating body and used for inserting into the conventional outlet. The quick releasing portion of the insulating body is detachably sliding on the track of the casing along the sliding direction for maintaining the relative position between the current converting device and the combinative plug and for establishing electrical connection between the conductive pin set and the current converting module.

Preferably, the track has two restricting surfaces and an extended surface connected to the restricting surfaces, wherein the quick releasing portion has two contacting surfaces and a bottom surface connected to the contacting surfaces, and wherein the contacting surfaces are respectively abutting on the restricting surfaces.

Preferably, the track has a bump protruding from the extended surface, the quick releasing portion has a receiving trough concavely formed from the bottom surface, and wherein the bump is engaged with the receiving trough.

Preferably, the quick releasing portion has a guiding trough concavely formed from the bottom surface along the sliding direction and communicated to the receiving trough, and wherein the depth of the guiding trough is smaller than the depth of the receiving trough.

Preferably, the current converting device has a track groove concavely formed along the sliding direction from one portion of the track adjacent to the first opening, and wherein the combinative plug has a sliding block protruding from the bottom surface of the quick releasing portion, and the sliding block conforms in shape to the track groove and is detachably sliding to the track groove along the sliding direction.

Preferably, the insulating body has a base and an extension extended from the base, and wherein the quick releasing portion is formed on one side of the base, and the conductive pin set penetrates the opposite side of the base.

Preferably, the current converting module has a circuit board disposed inside the casing and an AC socket disposed inside the casing and electrically connected to the circuit board, the AC socket has an inserted slot exposed via the first opening, the extension has a coupling portion conformed in shape to the inserted slot, and wherein when the quick releasing portion sliding on the track along the sliding direction, the coupling portion is inserted into the inserted slot simultaneously.

Preferably, the extension has a covering portion extended from the base, and wherein the coupling portion is extended from an inner surface of the covering portion along the sliding direction.

Preferably, the track number of the casing is two, and the two tracks are respectively formed on two opposite portions of the casing, and wherein the quick releasing portion is detachably sliding on one of the tracks along the sliding direction.

Preferably, the extension has a hook protruding from the inner surface of the covering portion away from the base, and wherein the hook is engaged with the casing.

Base on the above, the combinative plug is firmly connected to the current converting device by the quick releasing portion installing to the track. Moreover, the combinative plug and the current converting device are separated easily by forcing along the sliding direction.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

[First Embodiment]

Figure 1:
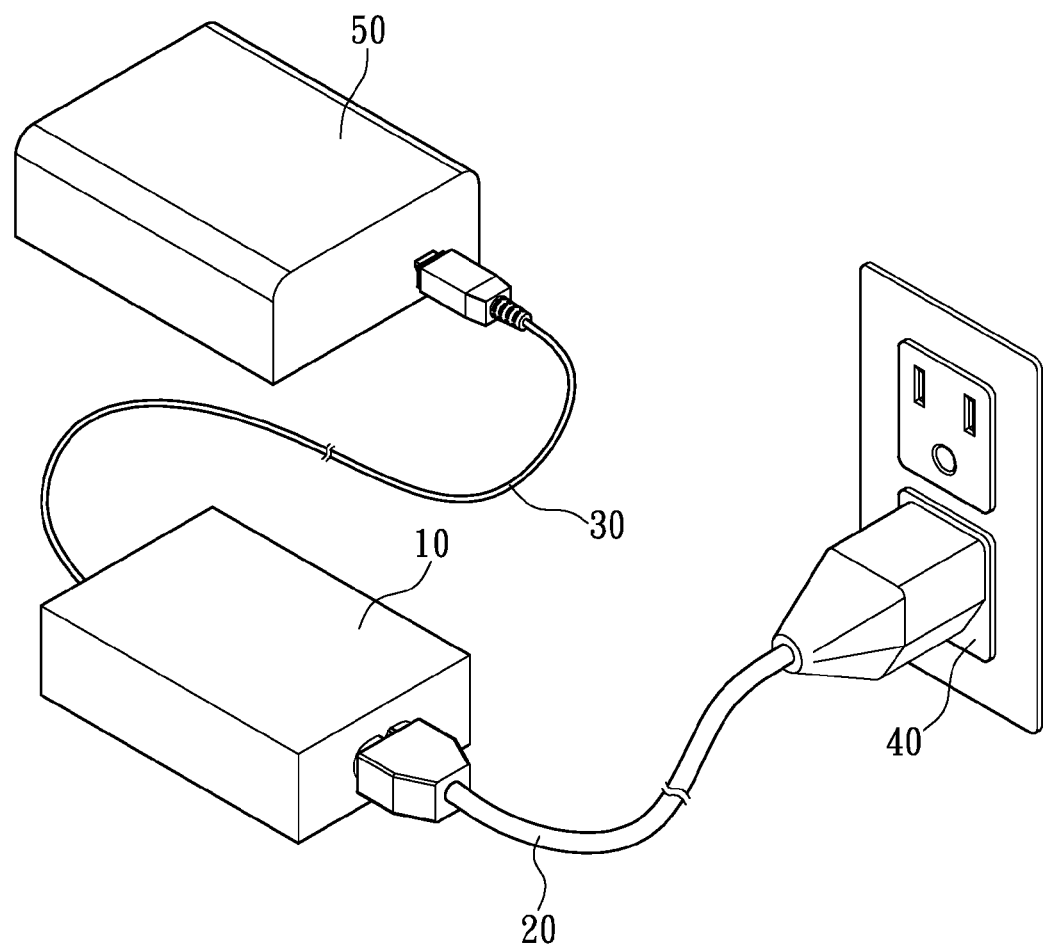
FIG. 1 is a perspective view of a conventional current converting device.
Figure 2A:
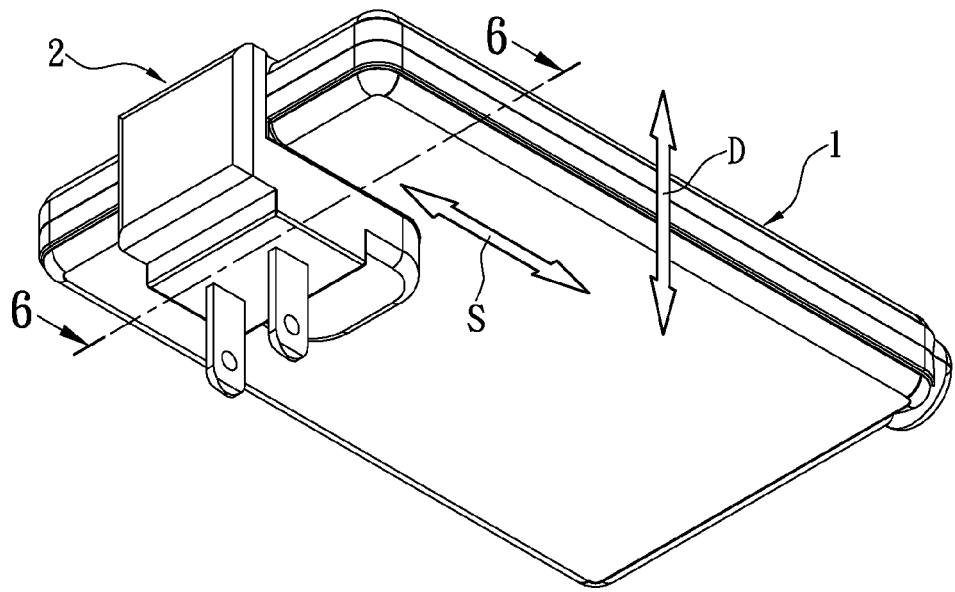
FIG. 2A is a perspective view of a current convertor of the instant disclosure.
Figure 2B:
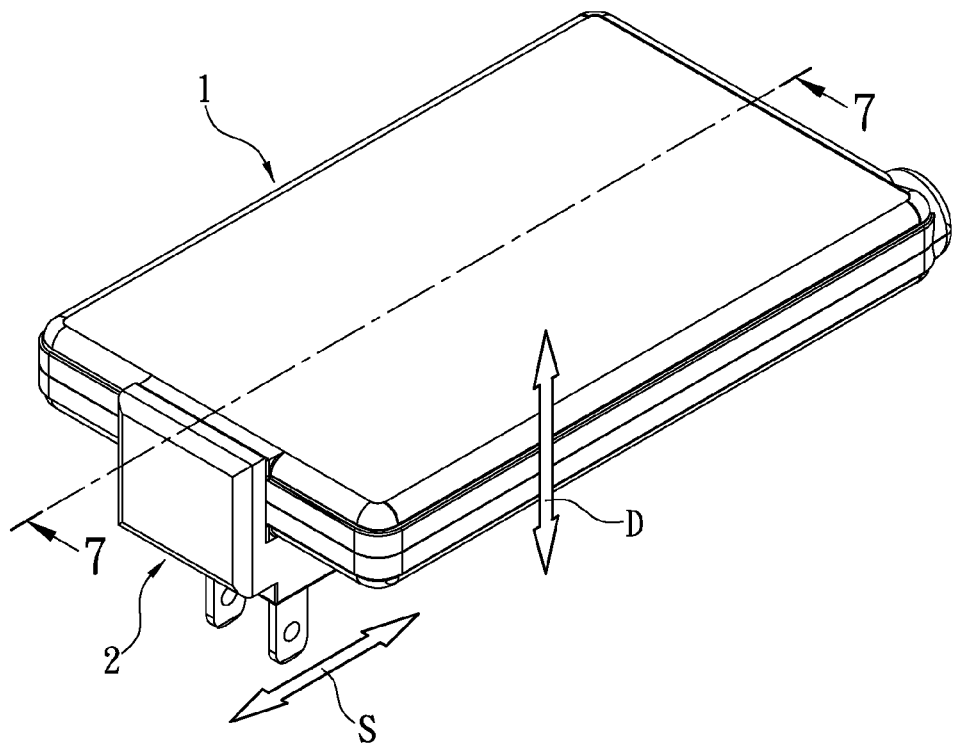
FIG. 2B is a perspective view of the current convertor of the instant disclosure at another view angle.

Please refer to FIGS. 2A and 2B, which show a first embodiment of the instant disclosure. This embodiment provides a current convertor for inserting into a conventional outlet (e.g., the wall outlet 40 as FIG. 1 shown).

The current convertor has a thinning current converting device 1 and an assembly plug 2 (hereafter referred as a combinative plug 2) used to install on the current converting device 1.

Figure 3A:
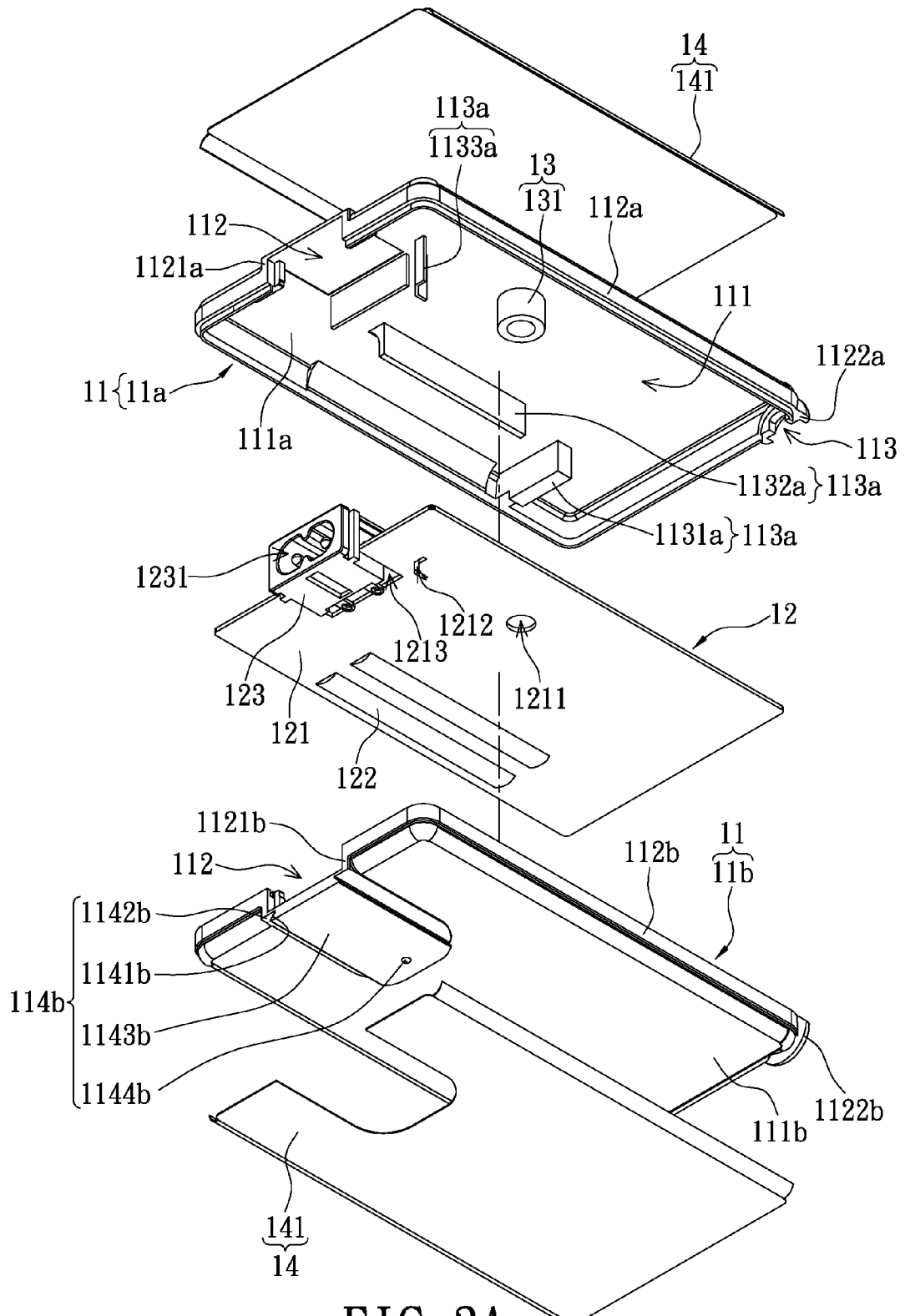
FIG. 3A is an exploded view of the current converting device of the instant disclosure.
Figure 3B:
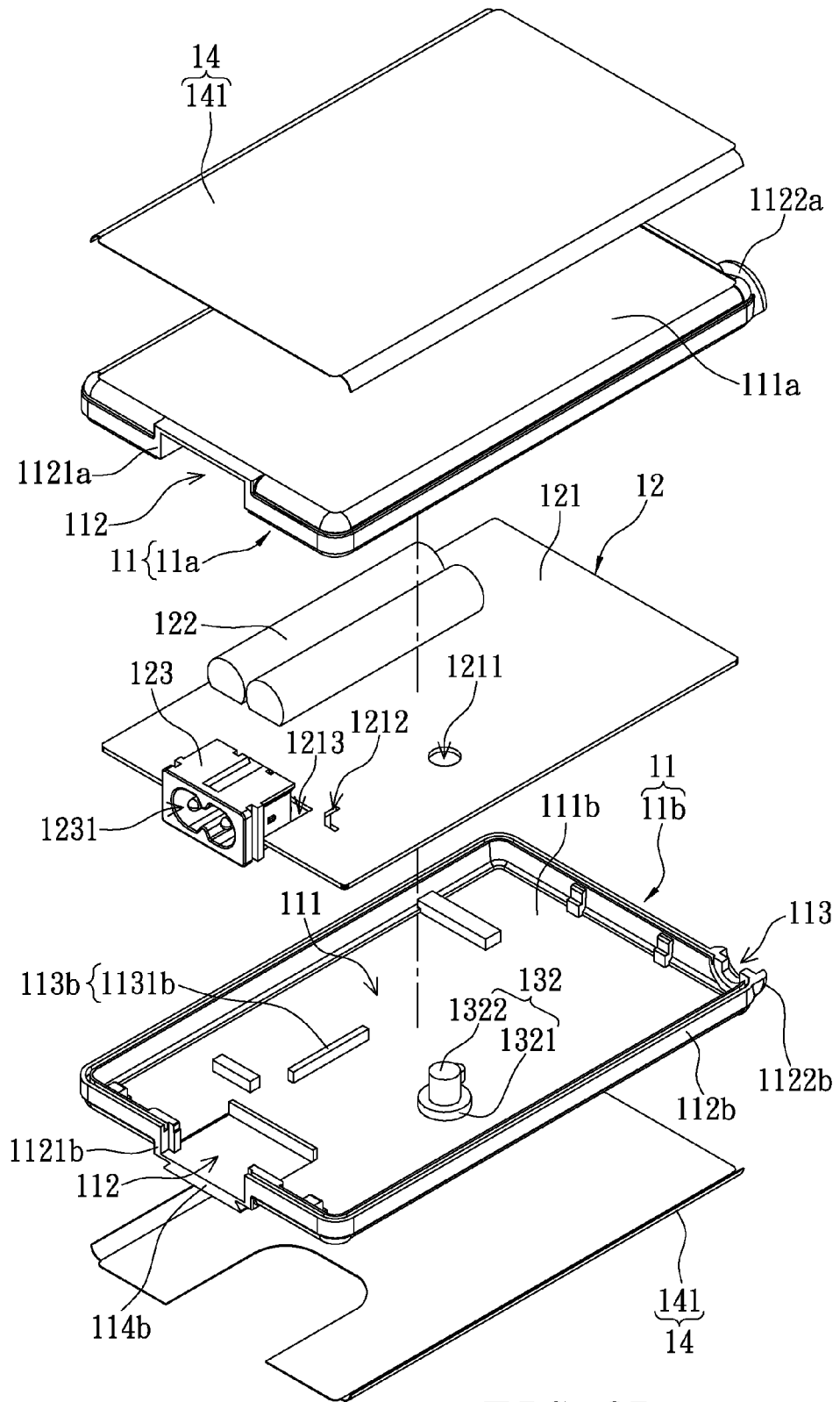
FIG. 3B is an exploded view of the current converting device of the instant disclosure at another view angle.

Please refer to FIGS. 3A and 3B, the current converting device 1 has a thin-profile casing 11, a current converting module 12, a buffer structure 13, and a heat dissipative structure 14. The current converting module 12 and the buffer structure 13 are disposed inside the casing 11, and the heat dissipative structure 14 is disposed on an outer surface of the casing 11.

The following description states the structural features of the casing 11, the current converting module 12, the buffer structure 13, and the heat dissipative structure 14 firstly, and then states the relationship of the above components.

The casing 11 defines a thickness direction D, an accommodating space 111, a first opening 112, and a second opening 113. The first opening 112 and the second opening 113 are in communication with the accommodating space 111. The casing 11 has a track 114b adjacent to the first opening 112, and the track 114b is extended from the outer surface of the casing 11 along a sliding direction S.

Specifically, the casing 11 has a first shelter 11a and a second shelter 11b installed on the first shelter 11a along the thickness direction D.

The first shelter 11a has a first main plate 111a having a rectangular shape, a first side plate 112a, and a plurality of first protrusions 113a.

The first main plate 111a has an approximately planar face surface (hereafter referred as an outer surface of the first main plate 111a), and the thickness direction D is substantially perpendicular to the outer surface of the first main plate 111a. The first side plate 112a is extended from the edge of the first main plate 111a. The section of the first side plate 112a, which is perpendicular to thickness direction D, has a rectangle shape. One edge of the first side plate 112a has a first receiving notch portion 1121a formed on the center portion thereof, and an opposite edge of first side plate 112a has a first notch portion 1122a.

The first protrusions 113a protrude from an inner surface of the first main plate 111a along the thickness direction D, and the first protrusions 113a have different structures.

Specifically, the first protrusions 113a are a plurality of first restricting pillars 1131a, a heat transmitting block 1132a, and a positioning pillar 1133a. The height of the positioning pillar 1133a is larger than the height of the first side plate 112a.

The second shelter 11b has a second main plate 111b having a rectangular shape, a second side plate 112b, a plurality of second protrusions 113b, and the track 114b.

The second main plate 111b has an approximately planar face surface (hereafter referred as an outer surface of the second main plate 111b), and the thickness direction D is substantially perpendicular to the outer surface of the second main plate 111b. The second side plate 112b is extended from the edge of the second main plate 111b. The section of the second side plate 112b, which is perpendicular to thickness direction D, has a rectangle shape. Specifically, the casing 11 has a peripheral surface arranged on the first and second side plates 112a, 112b, and the peripheral surface connects the edge of the face surface of the first main plate 111a and the edge of the face surface of the second main plate 111b. One edge of the second side plate 112b has a second receiving notch portion 1121b formed on the center portion thereof, and an opposite edge of second side plate 112b has a second notch portion 1122b.

Moreover, the position of the second receiving notch portion 1121b is corresponding to the position of the first receiving notch portion 1121a. The position of the second notch portion 1122b is corresponding to the position of the first notch portion 1122a.

The second protrusions 113b protrude from an inner surface of the second main plate 111b along the thickness direction D, and the second protrusions 113b have different structures. Specifically, the second protrusions 113b are a plurality of second restricting pillars 1131b.

The track 114b protrudes from one portion of the outer surface of the second main plate 111b, which is adjacent to the second receiving notch portion 1121b, along the sliding direction S. The sliding direction S in the instant embodiment is substantially perpendicular to the thickness direction D and substantially parallel to the longitudinal direction of the second main plate 111b.

Specifically, the track 114b in this embodiment takes a dovetail tenon for example. The track 114b has two opposite restricting surfaces 1141b, two opposite carrying surfaces 1142b, an extended surface 1143b, and a bump 1144b. The carrying surfaces 1142b are respectively extending from one edge of the restricting surfaces 1141b adjacent to the second main plate 111b, and two opposite edges of the extended surface 1143b is connecting to the opposite edge of the restricting surfaces 1141b. The bump 1144b protrudes from the extended surface 1143b.

Specifically, the thickness direction D is substantially perpendicular to the carrying surfaces 1142b and the extended surface 1143b, and the distance between the restricting surfaces 1141b increases along a direction, which is from the carrying surfaces 1142b to the extended surface 1143b. The bump 1144b is approximately arranged on one portion of the extended surface 1143b, which is away from the second receiving notch portion 1121b. The outer surface of the bump 1144b has a substantially half-spherical shape.

The current converting module 12 is used for converting an input AC power into a DC power to output. The current converting module 12 has a circuit board 121 having a rectangular shape, at least one electronic component 122, and an AC socket 123.

The circuit board 121 has a thru hole 1211, a positioning hole 1212, and a notch 1213. The notch 1213 is concavely formed from one short edge of the circuit board 121 along the sliding direction S. The position of the positioning hole 1212 is corresponding to the position of the positioning pillar 1133a.

The electronic component 122 is welded on the circuit board 121. The heat transmitting block 1132a conforms in shape to the electronic component 122. One portion of the AC socket 123 is arranged in the notch 1213 of the circuit board 121 and is electrically connected to the circuit board 121, and the opposite portion of the AC socket 123 has an insertion slot 1231 (hereafter referred as an inserted slot 1231) concavely formed therefrom.

The buffer structure 13 has a first buffer portion 131 disposed on the inner surface of the casing 11 and a second buffer portion 132 disposed on the inner surface of the casing 11 and facing the first buffer portion 131.

The first buffer portion 131 and the second buffer portion 132 are respectively extended toward each other from the inner surface of the first shelter 111a and the inner surface of the second shelter 111b along the thickness direction D, and shall not be limited to the example of the instant embodiment.

For example, the first buffer portion 131 and the second buffer portion 132 can be formed on the inner surface of the first shelter 111a and the inner surface of the second shelter 111b by another means (e.g., engaging, adhering, or screwing).

Specifically, the first buffer portion 131 has a tubular shape, and the second buffer portion 132 has a cylinder shape. The second buffer portion 132 has a large diameter segment 1321 extended from the inner surface of the second shelter 111b and a small diameter segment 1322 extended from the large diameter segment 1321.

The height of the second buffer portion 132 is larger than the height of the second side plate 112b, so that the small diameter segment 1322 is arranged outside the space surrounded by the second side plate 112b. The diameter of the small diameter segment 1322 is smaller than an inner diameter of the first buffer portion 131.

Moreover, the structure of the first buffer portion 131 and the structure of the second buffer portion 132 can be changed as they are matching with each other, and shall not be limited to the above example of the instant embodiment.

The heat dissipative structure 14 can be made of metal, heat transmitting plastic, or other suitable material. The heat dissipative structure 14 abuts on at least half of the outer surface of the casing 11.

The heat dissipative structure 14 has a plurality of heat transmitting sheets 141 adhered on the outer surface of the first shelter 111a and the outer surface of the second shelter 111b by a conductive glue (not shown), but not limited thereto.

For example, about the position of the heat dissipative structure 14, the heat dissipative structure 14 can abut on the outer surface of the first side plate 112a and the outer surface of the second side plate 112b expect the outer surface of the first shelter 111a and the outer surface of the second shelter 111b. Moreover, about the combined means between the heat dissipative structure 14 and the casing 11, the heat dissipative structure 14 can be combined on the outer surface of the casing 11 by insert molding or coating.

The relationship between the current converting module 12 and the casing 11, which is in connection with the buffer structure 13 and the heat dissipative structure 14, explains as follows.

The circuit board 121 is arranged in the accommodating space 111 surrounded by the first shelter 11a and the second shelter 11b. The second side plate 112b is installed on the first side plate 112a, the first receiving notch portion 1121a and the second receiving notch portion 1121b are connected to define the first opening 112, and the first notch portion 1122a and the second notch portion 1122b are connected to define the second opening 113.

Moreover, the positioning pillar 1133a of the first shelter 11a passes through the positioning hole 1212 of the circuit board 121. The first restricting pillar 1131a and the second restricting pillar 1131b are respectively abutted on two opposite surfaces of the circuit board 121. The electronic component 122 is partially abutted on the heat transmitting block 1132a of the first shelter 11a. The AC socket 123 is clipped between the first shelter 11a and the second shelter 11b, and the inserted slot 1231 exposes via the first opening 112.

Figure 4A:
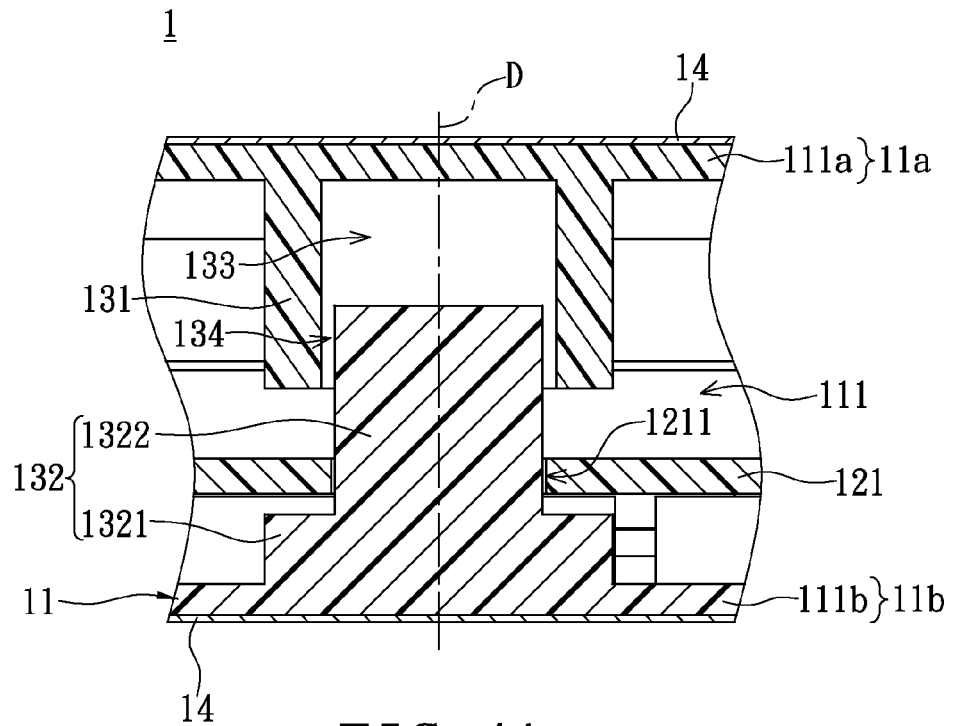
FIG. 4A is a section view of a buffer structure and a circuit board of the current converting device of the instant disclosure without pressing the current converting device.

Please refer to FIG. 4A. The small diameter segment 1322 passes through the thru hole 1211 of the circuit board 121 and inserts into the first buffer portion 131 along the thickness direction D. Moreover, an end surface of the first buffer portion 131 and an end surface of the large diameter segment 1321 are respectively spaced arranged with the opposite surfaces of the circuit board 121. A gap arranged between the end surface of the first buffer portion 131 and the surface of the circuit board 121 is defined as a buffer distance, and a gap arranged between the end surface of the large diameter segment 1321 and the opposite surface of the circuit board 121 is also defined as a buffer distance.

Moreover, a space is leaving between an end surface of the small diameter segment 1322 and the inner surface of the first shelter 11a. The inner diameter of the first buffer portion 131 is slightly larger than the diameter of the small diameter segment 1322. In other words, the first buffer portion 131 and the small diameter segment 1322 of the second buffer portion 132 surroundingly define a buffer space 133 and a gap 134 in communication with the buffer space 133. Specifically, the buffer space 133 is communicated to the outer space arranged outside the buffer structure 13 just via the gap 134.

The gap 134 scale in the figure is used to explain, and the gap 134 scale can be changed by the designer. For example, the gap 134 can be designed to gradually smaller along a specific direction, which is from the first main plate 111a of the first shelter 11a to the second main plate 111b of the second shelter 11b.

Thus, heat of the casing 11 transmitted from the electronic component 122 is rapidly dissipating via the heat dissipative structure 14. Moreover, the current converting device 1 of the instant disclosure is thinner than the prior structure by disposing the heat dissipative structure 14 on the outer surface of the casing 11 to achieve the user's demand.

Figure 4B:
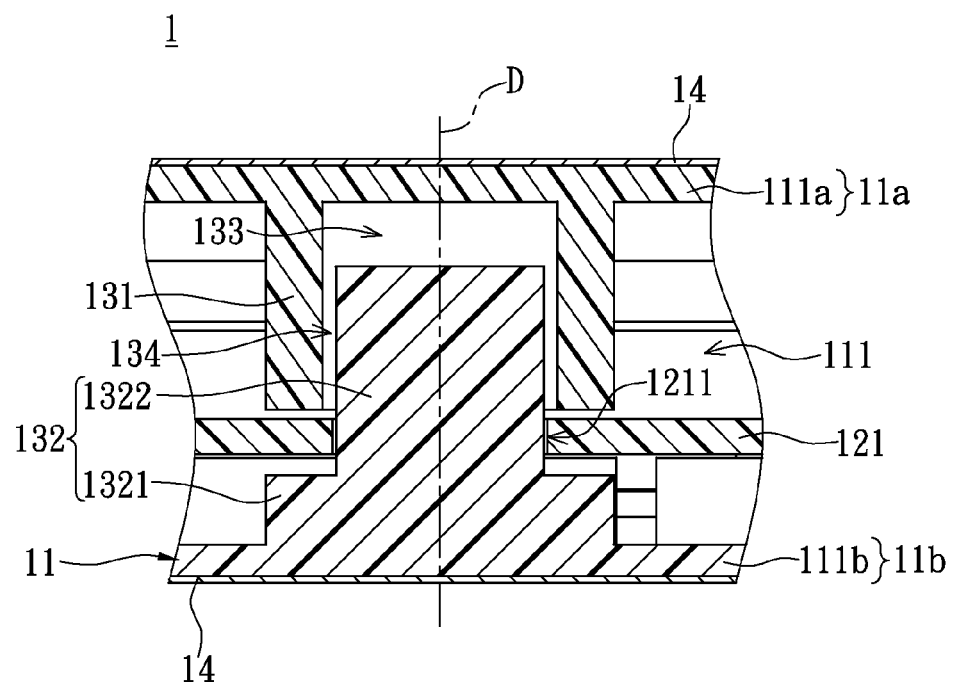
FIG. 4B is a section view of the buffer structure and the circuit board of the current converting device of the instant disclosure when pressing the current converting device.

Please refer to FIG. 4B. When pressing the casing 11 along the thickness direction D, the buffer distances are provided for enabling the first shelter 11a and the second shelter 11b to move toward each other, and the air in the buffer space 133 flows out via the gap 134 for reducing the relative speed between the first buffer portion 131 and the second buffer portion 132, thereby reducing the broken possibility of the current converting device 1 when the current converting device 1 having a thinning shape.

Figure 8:
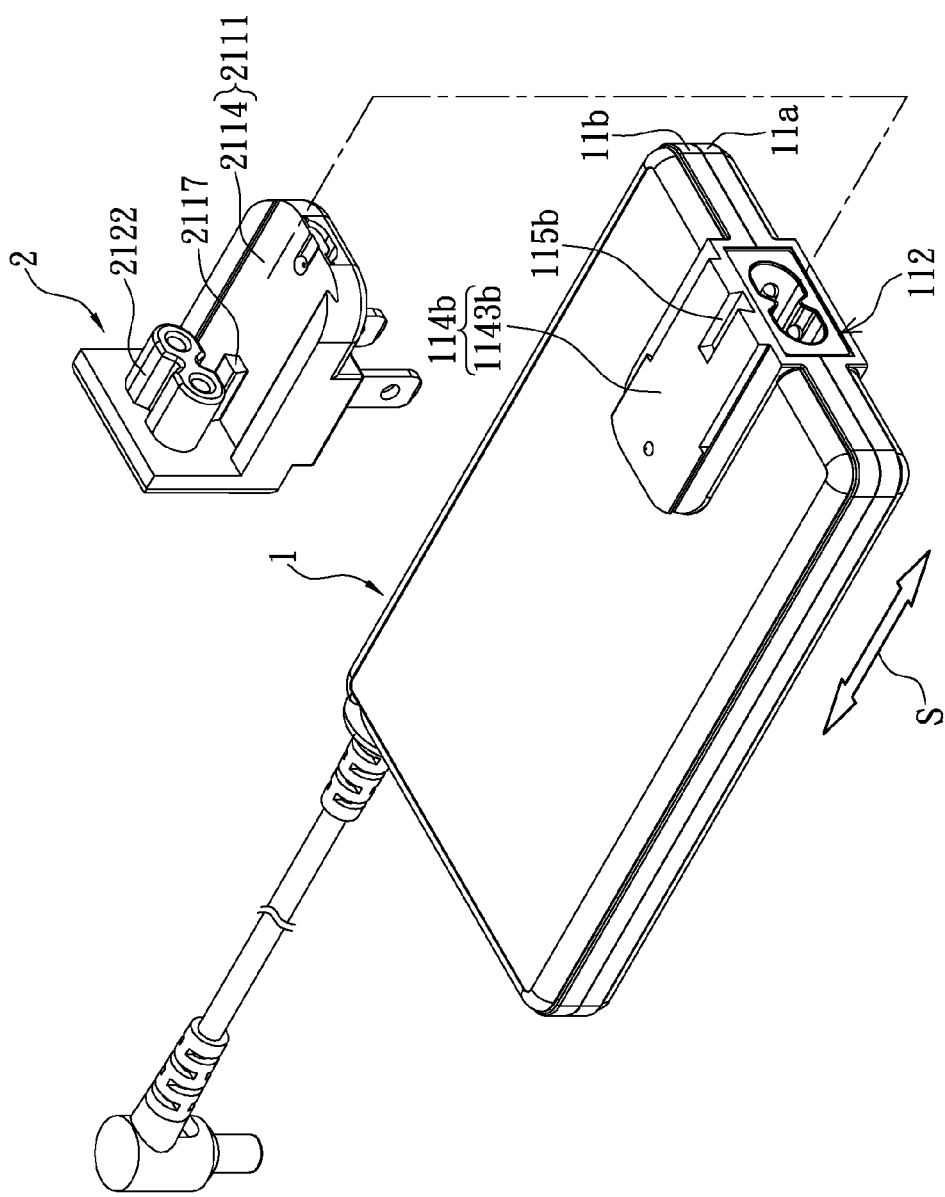
FIG. 8 is an exploded view of the current convertor of a second embodiment of the instant disclosure.

Incidentally, the second opening 113 of the casing 11 is provided for a DC module to electrically connect to the circuit board 121 (as FIG. 8 shown). For example, the DC module can be a DC transmission wire, which one end electrically connects to the circuit board 121 and the other end electrically connects to an electronic device (not shown); or the DC module can be a DC socket (e.g., USB socket) allowing insertion with a DC plug (e.g., USB plug).

Figure 5A:
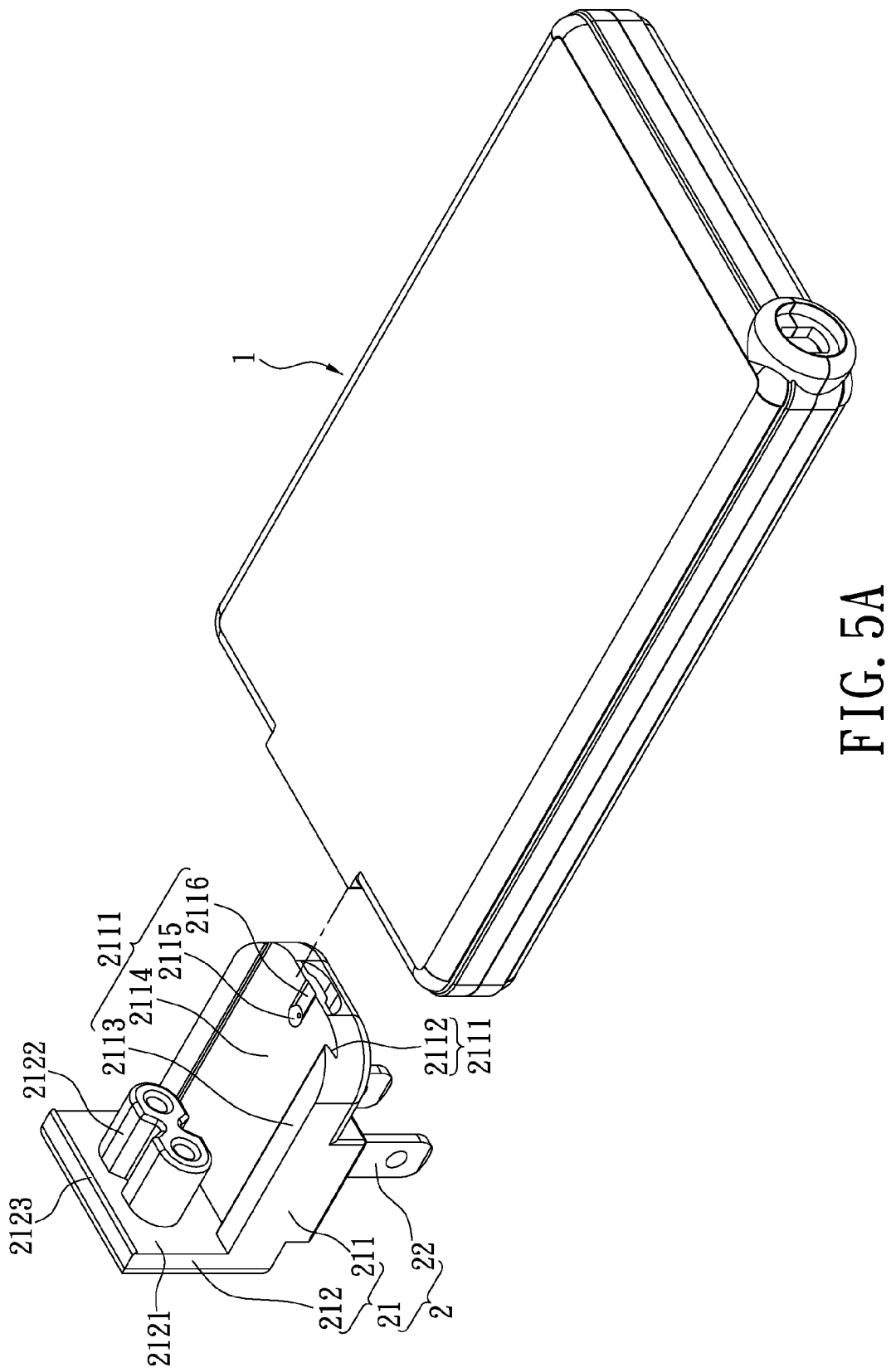
FIG. 5A is an exploded view of the current convertor of the instant disclosure.
Figure 5B:
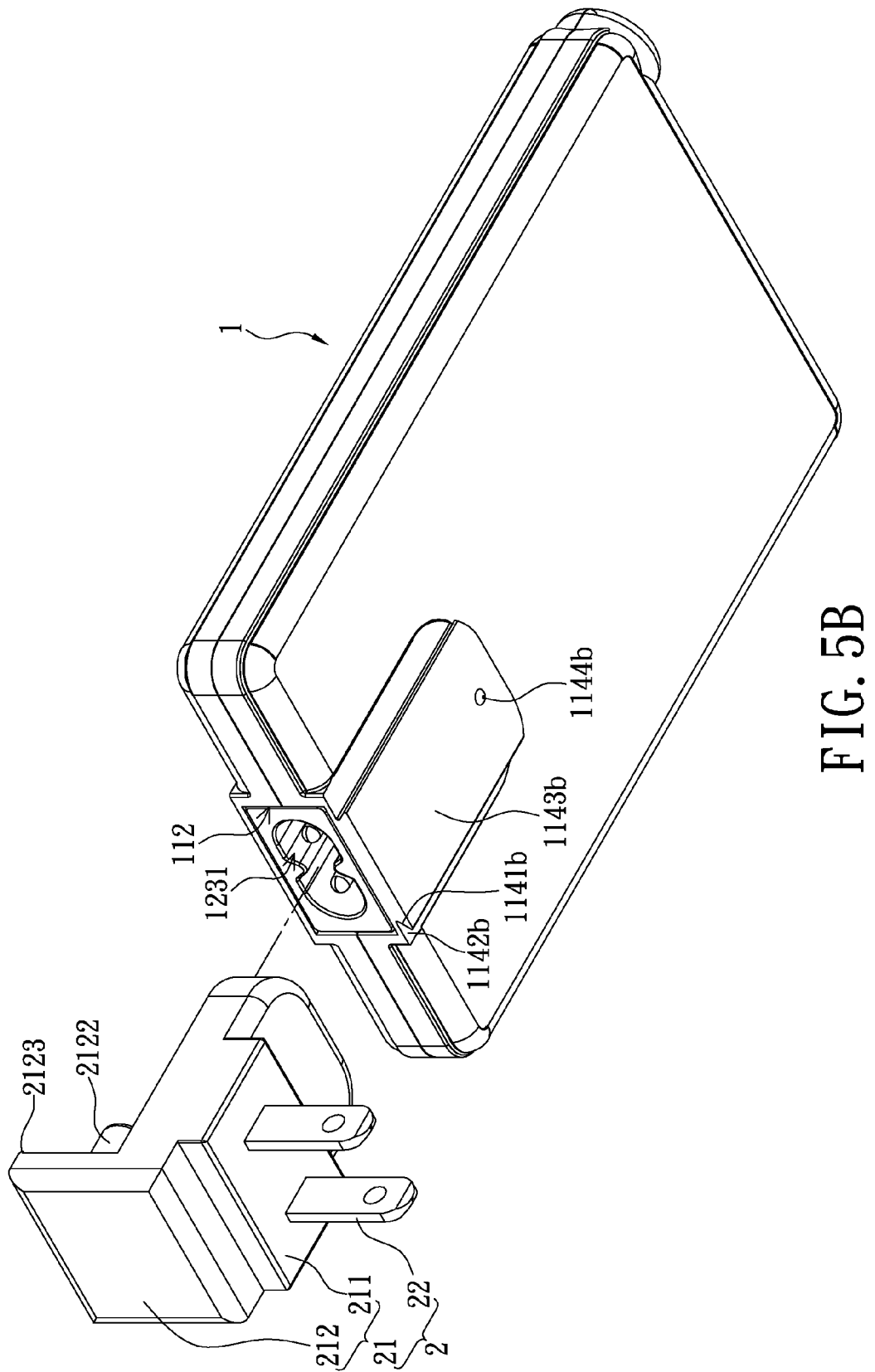
FIG. 5B is an exploded view of the current convertor of the instant disclosure at another view angle.

Please refer to FIGS. 5A and 5B. The combinative plug 2 has an insulating body 21 and a conductive pin set 22. The insulating body 21 is detachably sliding on the track 114b of the casing 11. The conductive pin set 22 is disposed on the insulating body 21 and is used for inserting into the conventional outlet (e.g., the wall outlet 40 as FIG. 1 shown).

The insulating body 21 has a base 211 and an extension 212 extended from the base 211. The base 211 of the insulating body 21 has a quick releasing portion 2111 conformed in shape to the track 114b, a receiving trough 2115, and a guiding trough 2116. The quick releasing portion 2111 is formed on one side of the base 211, and the conductive pin set 22 penetrates the opposite side of the base 211.

Specifically, the quick releasing portion 2111 has two contacting surfaces 2112, a top surface 2113 connected to one edge of each contacting surface 2112, and a bottom surface 2114 connected to the opposite edge of each contacting surface 2112. The contacting surfaces 2112 and the bottom surface 2114 define a dovetail trough conformed in shape to the track 114b.

The receiving trough 2115 is concavely formed from the bottom surface 2114, and the receiving trough 2115 conforms in shape to the bump 1144b. The guiding trough 2116 is concavely formed from the bottom surface 2114 along the sliding direction S and in communication with the receiving trough 2115. The depth of the guiding trough 2116 is smaller than the depth of the receiving trough 2115.

The extension 212 has a covering portion 2121 extended from the base 211, a coupling portion 2122 extended from an inner surface of the covering portion 2121 along the sliding direction S, and a hook 2123 protruding from one edge of the inner surface of the covering portion 2121, which is away from the base 211. The covering portion 2121 has a platy shape. The section of the covering portion 2121 and the base 211 presents L-shaped. The coupling portion 2122 conforms in shape to the inserted slot 1231.

When using the current convertor, inserting the quick releasing portion 2111 of the combinative plug 2 into the track 114b of the casing 11 along the sliding direction S for maintaining the relative position of the combinative plug 2 and the current converting device 1.

Figure 6:
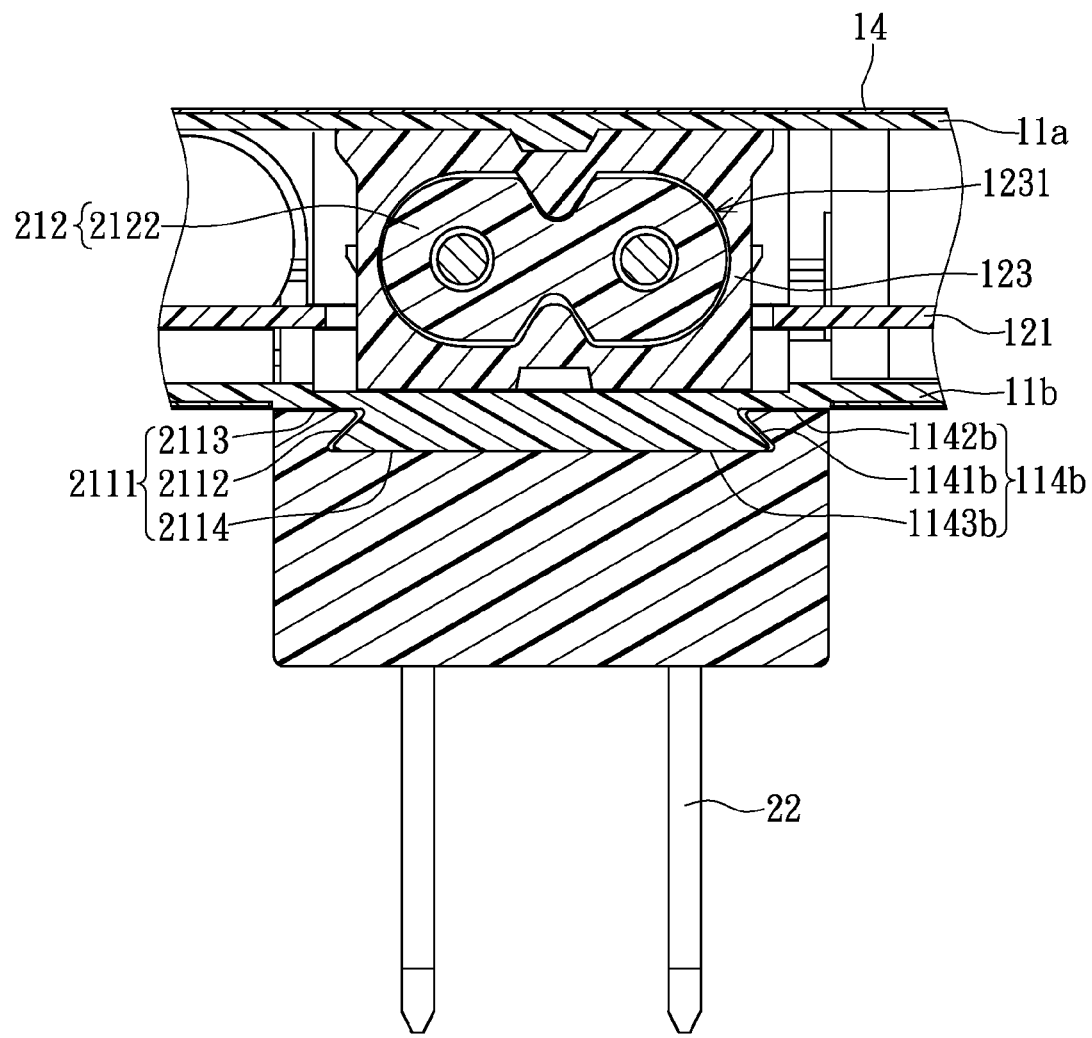
FIG. 6 is a section view of FIG. 2A along the sectional line 6-6.
Figure 7:
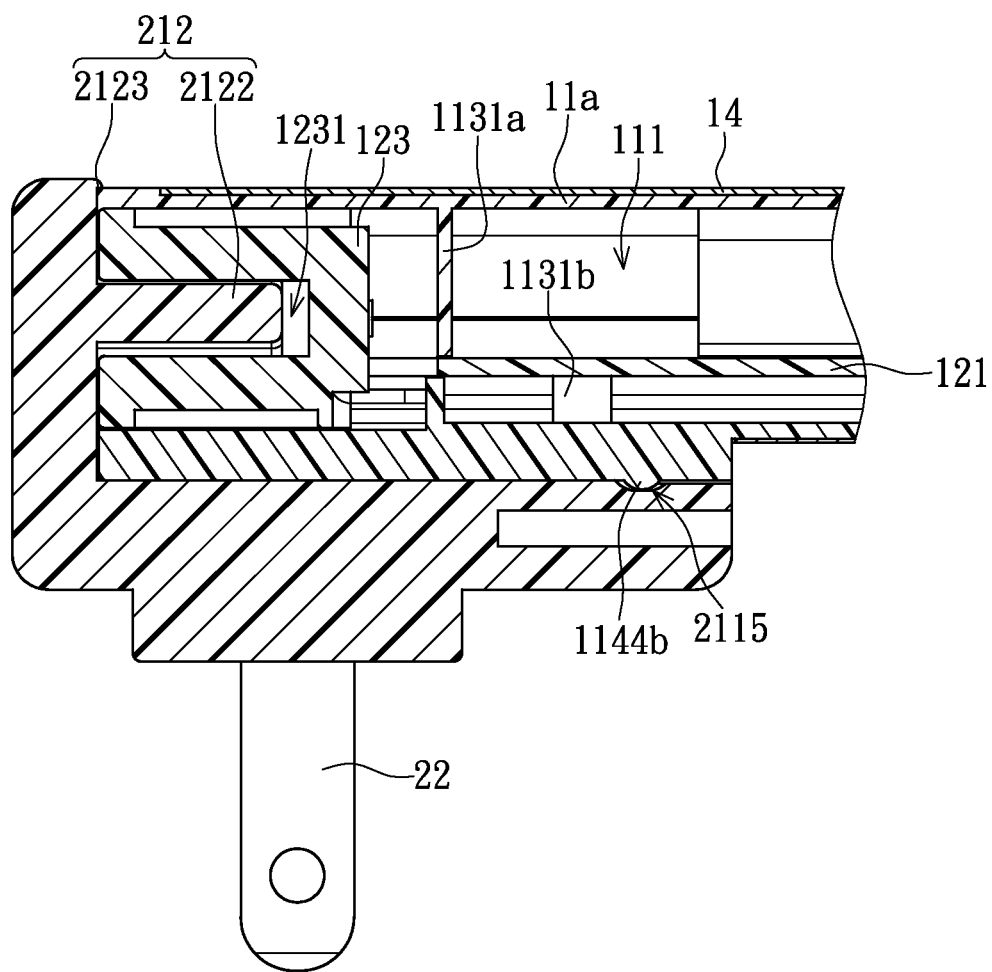
FIG. 7 is a section view of FIG. 2B along the sectional line 7-7.

Specifically, please refer to FIGS. 6 and 7, firstly inserting one end of the quick releasing portion 2111, which is away from the covering portion 2121, into one portion of the track 114b, which is adjacent to the first opening 112; and then taking the quick releasing portion 2111 to slide along the track 114b for engaging the receiving trough 2115 and the bump 1144b with each other after the bump 1144b moving along the guiding trough 2116.

Moreover, the coupling portion 2122 of the quick releasing portion 2111 is inserted into the inserted slot 1231 of the AC socket 123 to establish electrical connection between the conductive pin set 22 and the circuit board 121 via the AC socket 123. The hook 2123 of the extension 212 is hooked to one portion of the first shelter 11a, which is adjacent to the first opening 112.

Thus, the combinative plug 2 does not move relative to the current converting device 1 along the thickness direction D by the contacting surfaces 2112 respectively abutted on the restricting surfaces 1141b of the track 114b and the coupling portion 2122 inserted into the inserted slot 1231. Moreover, the combinative plug 2 does not move relative to the current converting device 1 along the sliding direction S by engaging the receiving trough 2115 and the bump 1144b with each other.

[Second Embodiment]

Please refer to FIG. 8, which shows a second embodiment of the instant disclosure. The difference between the instant embodiment and the above embodiment is as follows.

The second shelter 11b has a track groove 115b, and the track groove 115b is preferable a dovetail trough structure. The track groove 115b is concavely formed from one end of the track 114b, which is adjacent to the first opening 112, along the sliding direction S. In other words, the track groove 115b is concavely formed from the extended surface 1143b along the thickness direction D.

The combinative plug 2 has a sliding block 2117 conformed in shape to the track groove 115b. Specifically, the position of the sliding block 2117 is corresponding to the position of the track groove 115b, and the sliding block 2117 is preferable a dovetail tenon structure.

Moreover, the sliding block 2117 protrudes from the bottom surface 2114 of the quick releasing portion 2111. The sliding block 2117 is arranged between the coupling portion 2122 and the bottom surface 2114.

Thus, when the combinative plug 2 combined with the current converting device 1, the connection stability of the combinative plug 2 and the current converting device 1 is improved by engaging the sliding block 2117 and the track groove 115b with each other.

[Third Embodiment]

Figure 9:
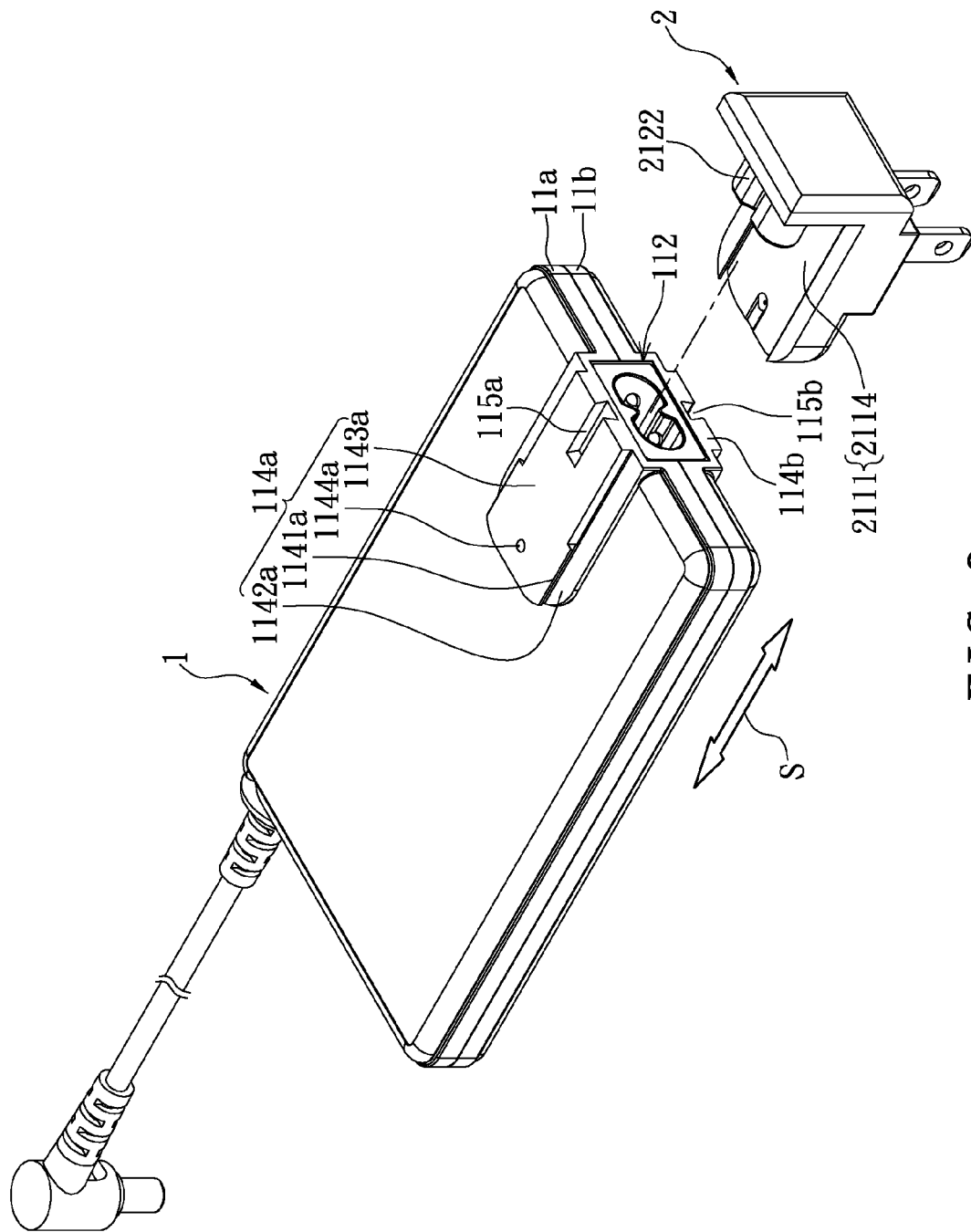
FIG. 9 is an exploded view of the current convertor of a third embodiment of the instant disclosure.
Figure 10:
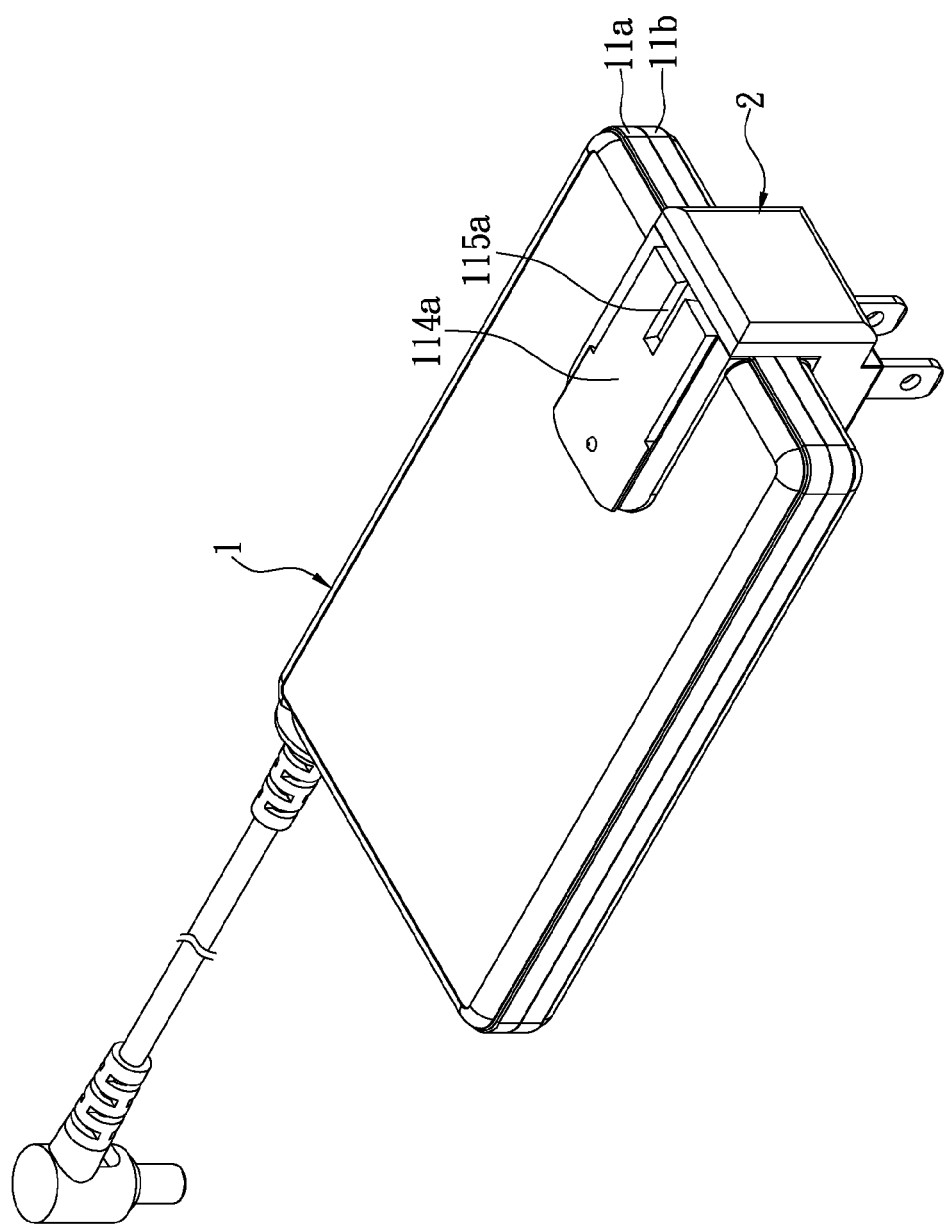
FIG. 10 is a perspective view of the current convertor of the third embodiment of the instant disclosure.

Please refer to FIGS. 9 and 10, which show a third embodiment of the instant disclosure. The difference between the instant embodiment and the above embodiment is as follows.

The first shelter 11a has a track 114a formed on the first main plate 111a thereof. The tracks 114a, 114b are arranged on two opposite portions of the current converting device 1.

The track 114a is identical to the track 114b, that is to say, the track 114a has two restricting surfaces 1141a, two carrying surfaces 1142a, an extended surface 1143a, and a bump 1144a.

Thus, the combinative plug 2 can be inserted into one of the tracks 114a, 114b by the user's demand.

Moreover, the first shelter 11a also has a track groove 115a, and the track groove 115a is identical to the track groove 115b. The track groove 115a is concavely formed from one end of the track 114a, which is adjacent to the first opening 112, along the sliding direction S. In other words, the track groove 115a is concavely formed from the extended surface 1143a along the thickness direction D.

Base on the above, the combinative plug is firmly connected to the current converting device by the quick releasing portion installing to the track.

Moreover, the combinative plug is more firmly connected to the current converting device by the receiving trough and the hook. The combinative plug and the current converting device are separated easily by forcing along the sliding direction to separate the receiving trough and the bump.

Because the first shelter and the second shelter each has a track, so that the combinative plug can be inserted into one of the tracks by the user's demand.

Moreover, when the combinative plug combined with one of the first and the second shelters of the current converting device, the connection stability of the combinative plug and the current converting device is improved by engaging the sliding block and the mating track groove with each other.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A current convertor for inserting into a conventional outlet, comprising:
   a current converting device comprising:
      a thin-profile casing having a pair of opposing main surfaces and a peripheral surface connecting the edges of the main surfaces,
      wherein the casing has at least one track extending from one of the main surfaces; and
      a current converting module arranged in the casing, the current converting module having an AC socket fixed on the casing,
      wherein the AC socket has an insertion slot exposed from the peripheral surface; and
   an assembly plug comprising:
      an insulating body having a base, a covering portion extending from the base, and a coupling portion extending from the covering portion,
      wherein the covering portion and the base cooperatively defines a L-shaped structure, the base has a quick releasing portion conforming in shape to the track; and
      a conductive pin set disposed on the insulating body and protruding from the base for inserting into the conventional outlet;
   wherein the quick releasing portion of the insulating body is detachably sliding on the track of the casing along a sliding direction parallel to each face surface, as the quick releasing portion is sliding on the track, the coupling portion is inserted into the insertion slot for establishing electrical connection between the conductive pin set and the current converting module.

2. The current convertor as claimed in claim 1, wherein the track has two restricting surfaces and an extended surface connected to the restricting surfaces, wherein the quick releasing portion has two contacting surfaces and a bottom surface connected to the contacting surfaces, and wherein the contacting surfaces are respectively abutting on the restricting surfaces.

3. The current convertor as claimed in claim 2, wherein the track has a bump protruding from the extended surface, the quick releasing portion has a receiving trough concavely formed from the bottom surface, and wherein the bump is engaged with the receiving trough.

4. The current convertor as claimed in claim 3, wherein the quick releasing portion has a guiding trough concavely formed from the bottom surface along the sliding direction and communicated to the receiving trough, and wherein the depth of the guiding trough is smaller than the depth of the receiving trough.

5. The current convertor as claimed in claim 2, wherein the current converting device has a track groove concavely formed from one portion of the track along the sliding direction, and wherein the assembly plug has a sliding block protruding from the bottom surface of the quick releasing portion, and the sliding block conforms in shape to the track groove and is detachably sliding to the track groove along the sliding direction.

6. The current convertor as claimed in claim 1, wherein the quick releasing portion is formed on one side of the base, and the conductive pin set penetrates the opposite side of the base.

7. The current convertor as claimed in claim 6, wherein the current converting module has a circuit board disposed inside the casing and electrically connected to the AC socket, the coupling portion conforms in shape to the insertion slot.

8. The current convertor as claimed in claim 7, wherein the coupling portion is extended from an inner surface of the covering portion along the sliding direction.

9. The current convertor as claimed in claim 1, wherein the number of the track of the casing is two, and the two tracks are respectively formed on the main surfaces, and wherein the quick releasing portion is detachably sliding on one of the tracks along the sliding direction.

10. The current convertor as claimed in claim 8, wherein the insulating body has a hook protruding from the inner surface of the covering portion away from the base, and wherein the hook is engaged with the casing.

\* \* \* \* \*